Patented Sept. 12, 1944

2,358,162

UNITED STATES PATENT OFFICE

2,358,162

PROCESS FOR THE PREPARATION OF COMPOUNDS CONTAINING FUSED PYRIDINE RINGS

John Theodore Hewitt, Hurst, and Trustham Frederick West, London, England, assignors to Stafford Allen and Sons Limited, London, England No Drawing. Application May 18, 1942, Serial No. 443,504. In Great Britain September 1, 1941

9 Claims. (Cl. 260—283)

This invention relates to the production of quinoline and other tertiary bases containing an aromatic ring fused with a pyridine ring and has for its primary object to afford improvements in the well known Skraup process for the synthesis of quinoline and certain of its derivatives.

The original Skraup process consisted in heating one part by weight of aniline with one and one-half parts by weight of sulphuric acid and one part by weight of glycerol to 180°–190° C.

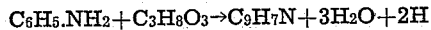

$$C_6H_5.NH_2 + C_3H_8O_3 \rightarrow C_9H_7N + 3H_2O + 2H$$

The Skraup synthesis is generally effected, as described in U. S. Patent No. 241,738, by adding nitrobenzene or m-nitrobenzoic acid to the mixture of aniline, glycerol and sulphuric acid. After the reaction is completed by heating, gently at first and more strongly afterwards, the mass is diluted, excess of nitrobenzene removed in a current of steam, the solution of quinoline sulphate then rendered alkaline and the quinoline blown over by steam.

Various methods are known for removing unaltered aniline from the quinoline such as isolation of the acid sulphate of the quinoline, diazotisation of the aniline by addition of a nitrite to the acid solution or oxidation of the aniline by warming with chromic acid mixture.

Whether the nitrobenzene furnishes any quinoline is doubtful since the yield of quinoline never attains that which might be expected from the aniline itself according to the equation given previously. The nitro group of the nitrobenzene possibly functions as a source of oxygen to combine with the excess of hydrogen.

While Skraup's reaction is of general applicability to primary aromatic bases (e. g. toluidines, halogeno- and nitro-anilines, naphthylamines etc.) it suffers from the disadvantage that it may become very violent, whilst the amount of glycerol commonly used is always much in excess of that required by the equation. There is also the necessity of removing excess of nitro-compound in a separate operation.

The object of the invention is to dispense with the use of nitrobenzene as an oxidising agent and at the same time to enable the violence of the reaction to be lessened.

Various inorganic oxidising agents have been proposed for use in the Skraup process in place of nitrobenzene, for example arsenic acid and calcined ferric oxide.

We find that the condensation of aromatic primary amines with glycerol by treatment with concentrated sulphuric acid proceeds extremely satisfactorily when the condensation is effected in the presence of elementary iodine, and our invention is based on this discovery.

Our process therefore involves the use of sulphuric acid as the oxidising agent in accordance to a reaction represented approximately by the equation

$$C_6H_7N + C_3H_8O_3 + H_2SO_4 \rightarrow C_9H_7N + SO_2 + 5H_2O$$

This gives the following advantages as compared with the Skraup process and the above-mentioned alternative proposals:—(a) cheapness of oxidising agent (b) avoidance of separation from excess of nitrobenzene as in the case of the Skraup reaction and (c) avoidance of separation from reduced inorganic material such as arsenious or ferrous compounds.

The iodine essential to the process according to our invention may be added to the mixture as such, or in the form of a compound or a mixture of compounds yielding iodine in contact with sulphuric acid. Thus we have used an iodide or a mixture of an iodide and iodate since iodine is liberated in the free state and in a finely divided form in accordance with the equations.

$$2KI + 3H_2SO_4 \rightarrow 2KHSO_4 + 2H_2O + SO_2 + I_2$$

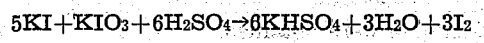

$$5KI + KIO_3 + 6H_2SO_4 \rightarrow 6KHSO_4 + 3H_2O + 3I_2$$

We have also obtained quinoline from aniline by adding the iodine in the form of iodoform.

Whilst concentrated sulphuric acid has been generally employed by us, the initial presence of a certain small amount of water does not inhibit the reaction although we have found that better yields are obtainable by using the concentrated acid. The expression "concentrated sulphuric acid" used in the appended claims is accordingly to be understood as including a concentrated acid diluted by addition of a small amount of water.

We have established that our process can be applied in the case of other primary aromatic amines besides aniline, thus the toluidines give methylquinolines, aminophenols give hydroxyquinolines and the phenylenediamines are converted into phenanthrolines on heating with glycerol, sulphuric acid and iodine or a compound or mixture of compounds yielding iodine.

In carrying out the reaction, we have gradually heated the mixture of all the ingredients and have found that mechanical stirring is advantageous though not essential. Our process has the following advantages:

(a) The reaction proceeds smoothly and can be carried to completion at a lower temperature and in a shorter time than when nitro-compounds are employed.

(b) The yield is usually better and no preliminary removal of unaltered nitro-compound is necessary before liberation of the quinoline or corresponding base from the acid solution is effected by the addition of alkali.

(c) The amount of glycerol employed is moderate. Whilst the quinoline or other base liberated by alkali and steam distilled is often sufficiently pure for direct use, it may be necessary to rid it of traces of unattacked primary base; for this purpose any of the usual methods of purification may be employed such as fractional distillation or destruction of the primary base by diazotisation or oxidation with chromic acid.

The invention is illustrated by the following examples in which "parts" are understood to be "parts by weight" unless "parts by volume" are specifically stated. We do not confine ourselves to the quantities given in the examples since these may be varied within wide limits.

The materials specified in the examples are understood to be of good commercial quality, thus the sulphuric acid was concentrated acid of 95% or greater strength except in Example 6 when water was added before the reaction.

Example 1

Powdered iodine (5 parts) was added to a mixture of sulphuric acid (300 parts), glycerol (150 parts) and aniline (100 parts) and the mass heated with continuous mechanical stirring. Visible evolution of sulphur dioxide began at 141° C., the final temperature attained being 180° C. Completion of the reaction at this temperature was indicated by the cessation in the production of sulphur dioxide. The product was run off into a solution of caustic soda, the quinoline distilled in steam and separated from the distillate which was then extracted with benzene to remove any quinoline dissolved or suspended in the water. The benzene was then removed by distillation and the quinoline recovered added to that previously separated from the water. After distillation under reduced pressure, 93 parts of quinoline containing a negligible amount of aniline were obtained.

Example 2

Powdered iodine (2.5 parts) was added to a mixture of sulphuric acid (75 parts), glycerol (27.5 parts) and aniline (25 parts) and the mass heated with continuous mechanical stirring. Visible reaction began at 138° C., the final temperature attained being 158° C. The product was run off into a solution of caustic soda, the liberated quinoline extracted with benzene, the benzene removed and the qinoline (15 parts) recovered by distillation under reduced pressure. It contained less than one half of one per cent of aniline.

Example 3

Powdered potassium iodide (0.89 parts) was added to a mixture of sulphuric acid (75 parts), glycerol (37.5 parts) and aniline (25 parts) and the mass heated with continuous stirring. Visible reaction began at 135° C., the final temperature was 140° C. The reaction product was diluted with water to about 500 parts by volume, filtered hot from a small amount of tarry material and 50 parts of sodium dichromate in 200 parts of water added to the hot solution. After standing in a cool place overnight, the addition compound was filtered off, the quinoline liberated by addition of caustic soda solution and the free quinoline distilled over in a current of steam.

Quinoline (22 parts) free from aniline was removed by separation from beneath the water layer.

Example 4

Powdered potassium iodide (2.62 parts) was added to a mixture of sulphuric acid (75 parts), glycerol (37.5 parts) and aniline (25 parts) and the mass heated with continuous mechanical stirring. Visible reaction began at 138° C., the final temperature attained being 162° C. The product was run off into a solution of caustic soda, the liberated quinoline extracted with benzene, the solvent removed and the crude base dissolved in concentrated hydrochloric acid (60 parts by volume) and diluted with water (200 parts by volume). This solution was cooled to 0° C., and a solution of sodium nitrite added until a positive blue reaction was obtained with starch-potassium iodide paper. The solution was freed from phenol by steam distillation, then rendered alkaline and the steam distillation continued. Quinoline (21 parts), free from aniline, separated from beneath the aqueous distillate.

Example 5

Powdered potassium iodide (2.18 parts) and powdered potassium iodate (0.56 parts) were added to a mixture of sulphuric acid (75 parts), glycerol (37.5 parts) and aniline (25 parts) and the mass heated with continuous mechanical stirring. Visible reaction began at 139° C., the final temperature attained being 158° C. The product was run off into a solution of caustic soda, the liberated quinoline extracted with benzene, the benzene removed and the quinoline (23 parts) recovered by distillation under reduced pressure. It contained less than one-half of one per cent of aniline.

Example 6

Powdered potassium iodide (1 part) was added to a mixture of concentrated sulphuric acid (75 parts), glycerol (37.5 parts), aniline (25 parts) and water (14 parts) and the mass heated with continuous mechanical stirring. Visible reaction began at 140° C., the final temperature attained being 150° C. The reaction product was diluted with water to about 400 parts by volume and treated with a solution of 50 parts of sodium dichromate in 200 parts of water. After standing in a cool place overnight, the addition compound was filtered off, the quinoline liberated by the addition of caustic soda solution and the free quinoline removed by steam distillation. 8 parts of quinoline, free from aniline, were removed from below the aqueous layer.

Example 7

A mixture of paratoluidine (38 parts), glycerol (50 parts), sulphuric acid (100 parts) and powdered potassium iodide (2 parts) was heated with continuous stirring. Visible reaction began at 138°–140° C., the temperature was raised to 150° and heating continued at 145°–150° C. for 30 minutes. The mass was made alkaline, distilled in a current of steam, the product dissolved in hydrochloric acid and sodium nitrite solution added to diazotise unaltered paratoluidine. Paracresol was removed by a current of steam, the solution then rendered alkaline and the steam distillation continued. 6-Methylquinoline (28 parts) was recovered by separation from the condensed water and distillation under reduced pressure (20 mm.).

Example 8

Iodoform (1.29 parts) was added to a mixture of sulphuric acid (75 parts), glycerol (37.5 parts) and aniline (25 parts) and the mass heated with continuous mechanical stirring. Visible reaction began at 138° C., the final temperature attained being 160° C. The product was run off into a solution of caustic soda, the liberated quinoline extracted with benzene, the benzene removed and the quinoline (18 parts) recovered by distillation under reduced pressure. It contained less than one-half of one per cent of aniline.

Example 9

Ortho-aminophenol (10 parts) was slowly added and thoroughly mixed with a mixture of sulphuric acid (33 parts) and glycerol (17 parts). Powdered iodine (0.5 part) was then added and the mass heated with continuous mechanical stirring. Visible reaction began at 123° C.; the final temperature attained was 135° C. After two hours heating in an oil-bath at this temperature the product was poured into 400 parts of water, the solution filtered, rendered slightly alkaline to litmus by the addition of caustic soda solution and the 8-hydroxyquinoline liberated by passing carbon dioxide through this solution. Steam distillation then gave 8-hydroxyquinoline as a white solid suspended in a bright yellow solution. Filtered off and dried, the white solid (6½ parts) melted sharply at 76°, which is the melting point recorded in the literature for 8-hydroxyquinoline.

Example 10

Iodine (1 part) was added to a thorough mixture of sulphuric acid (50 parts), glycerol (25 parts) and metaphenylenediamine (10 parts). The mixture was heated with continuous mechanical stirring. Visible reaction began at 130° C., the final temperature attained being 140° C. The product was poured into water (200 parts) and made alkaline by caustic soda solution (20%). The base was extracted with chloroform and removed from the chloroform by extraction with dilute hydrochloric acid. On rendering the acid solution alkaline, a yellowish red oil separated which slowly crystallised. The impure phenanthroline was purified by again dissolving it in chloroform extracting with dilute hydrochloric acid and neutralising with caustic soda solution. On standing, metaphenanthroline hydrate (melting point 64°) crystallised out.

What we claim as our invention and desire to secure by Letters Patent is:

1. A process for the production of compounds containing an aromatic ring fused with a pyridine ring by condensing a primary aromatic amine having an unsubstituted hydrogen atom in the ortho position in relation to the amino group and glycerol by treatment with concentrated sulphuric acid, characterised in that the condensation is effected in the presence of elementary iodine.

2. A process for the production of tertiary aromatic bases containing a fused pyridine ring, which comprises heating a mixture of iodine, concentrated sulphuric acid and glycerol and a primary aromatic amine having an unsubstituted hydrogen atom in the ortho position in relation to the amino group, thereafter adding an alkali to liberate the tertiary base formed by the reaction, and finally separating the base from the other constituents of the mixture.

3. A process for the production of tertiary aromatic bases containing a fused pyridine ring, which comprises heating a mixture of concentrated sulphuric acid, glycerol, a primary aromatic amine having an unsubstituted hydrogen atom in the ortho position in relation to the amino group, and an iodine containing compound which yields elementary iodine in contact with concentrated sulphuric acid, thereafter adding an alkali to liberate the tertiary base formed by the reaction, and finally separating the base from the other constituents of the mixture.

4. A process for the production of tertiary aromatic bases containing a fused pyridine ring, which comprises heating a mixture of potassium iodide, concentrated sulphuric acid and glycerol and a primary aromatic amine having an unsubstituted hydrogen atom in the ortho position in relation to the amino group, thereafter adding an alkali to liberate the tertiary base formed by the reaction, and finally separating the base from the other constituents of the mixture.

5. A process for the production of quinoline by condensing aniline and glycerol by treatment with concentrated sulphuric acid, characterised in that the condensation is effected in the presence of elementary iodine.

6. A process for the production of quinoline, which comprises heating a mixture of iodoform, concentrated sulphuric acid, glycerol and aniline, thereafter adding an alkali to liberate the quinoline, and finally separating the quinoline from the other constituents of the mixture.

7. A process for the manufacture of phenanthroline, which comprises condensing phenylene diamine with glycerol by treatment with concentrated sulphuric acid and in the presence of elementary iodine, thereafter adding alkali to liberate the phenanthroline and subsequently separating the phenanthroline from the other ingredients.

8. A process for the production of compounds containing an aromatic ring fused with a pyridine ring by condensing a primary aromatic amine having an unsubstituted hydrogen atom in the ortho position in relation to the amino group and glycerol by treatment with concentrated sulphuric acid, characterised in that the condensation is effected in the presence of elementary iodine, the reaction being completed at a temperature below 180° C.

9. A process for the production of compounds containing an aromatic ring fused with a pyridine ring by condensing a primary aromatic amine having an unsubstituted hydrogen atom in the ortho position in relation to the amino group and glycerol by treatment with concentrated sulphuric acid, characterised in that the condensation is effected in the presence of elementary iodine, the reaction being completed at a temperature of the order of 140–160° C.

JOHN THEODORE HEWITT.
TRUSTHAM FREDERICK WEST.